(12) United States Patent
Roddy et al.

(10) Patent No.: US 7,204,312 B2
(45) Date of Patent: Apr. 17, 2007

(54) COMPOSITIONS AND METHODS FOR THE DELIVERY OF CHEMICAL COMPONENTS IN SUBTERRANEAN WELL BORES

(75) Inventors: Craig W. Roddy, Duncan, OK (US); Ronney R. Koch, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 147 days.

(21) Appl. No.: 10/768,323

(22) Filed: Jan. 30, 2004

(65) Prior Publication Data
US 2005/0167104 A1 Aug. 4, 2005

(51) Int. Cl.
*E21B 43/25* (2006.01)

(52) U.S. Cl. ............... 166/307; 166/300; 166/90.1; 166/75.15; 166/292

(58) Field of Classification Search ............... 166/300, 166/310, 307, 90.1, 75.15, 29, 292
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 3,129,760 A * | 4/1964 | Gambill | 166/300 |
| 3,157,232 A | 11/1964 | Ramos et al. | 166/38 |
| 3,784,585 A | 1/1974 | Schmitt et al. | 260/861 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,958,638 A | 5/1976 | Johnston et al. | 166/294 |
| 3,960,736 A | 6/1976 | Free et al. | 252/8.55 R |
| 3,998,272 A | 12/1976 | Maly | |
| 4,169,798 A | 10/1979 | DeMartino | 252/8.55 R |
| 4,202,795 A | 5/1980 | Burnham et al. | 252/332 |
| 4,261,421 A | 4/1981 | Watanabe | |
| 4,304,298 A | 12/1981 | Sutton | 166/293 |
| 4,340,427 A | 7/1982 | Sutton | 106/87 |
| 4,367,093 A | 1/1983 | Burkhalter et al. | 106/87 |
| 4,371,443 A | 2/1983 | Keeney | 252/8.55 C |
| 4,387,769 A | 6/1983 | Erbstoesser et al. | 166/295 |
| 4,450,010 A | 5/1984 | Burkhalter et al. | 106/87 |
| 4,470,915 A | 9/1984 | Conway | 252/8.55 R |
| 4,506,734 A | 3/1985 | Nolte | 166/308 |
| 4,526,695 A | 7/1985 | Erbstoesser et al. | 252/8.55 R |
| 4,565,578 A | 1/1986 | Sutton et al. | 106/87 |
| 4,715,967 A | 12/1987 | Bellis et al. | 252/8.551 |
| 4,716,964 A | 1/1988 | Erbstoesser et al. | 166/284 |
| 4,741,401 A | 5/1988 | Walles et al. | 166/300 |
| 4,770,796 A | 9/1988 | Jacobs | 252/8.553 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,957,165 A | 9/1990 | Cantu et al. | 166/295 |
| 4,961,466 A | 10/1990 | Himes et al. | 166/250 |
| 4,961,790 A | 10/1990 | Smith et al. | 106/823 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,203,629 A | 4/1993 | Valle et al. | 366/2 |
| 5,216,050 A | 6/1993 | Sinclair | 524/108 |
| 5,247,059 A | 9/1993 | Gruber et al. | 528/354 |
| 5,320,851 A | 6/1994 | de Mars | 424/451 |
| 5,359,026 A | 10/1994 | Gruber | 528/354 |
| 5,373,901 A | 12/1994 | Norman et al. | 166/300 |

(Continued)

FOREIGN PATENT DOCUMENTS

EP      0 211 079      2/1987

(Continued)

OTHER PUBLICATIONS

Paper entitled "Poly(phenyllactide): Synthesis, Characterization, and Hydrolytic Degradation" by Tara L. Simmons et al., dated 2001.
Paper entitled "Synthesis and Properties of Polymers Derived from Substituted Lactic Acids" by Mao Tin et al., dated 2001.
Paper entitled "Macromolecules" by Mao Yin et al., dated 1999.
Paper entitled "Advanced in Polymer Science" by Professor Akihiro Abe et al. dated 2002, pp. 1-138.
Cantu, et al., "Laboratory and Field Evaluation of a Combined Fluid-Loss-Control Additive and Gel Breaker for Fracturing Fluids," SPE Paper 18211.
Simmons, et al., "Poly(phenyllactide): Synthesis, Characterization, and Hydrolytic Degradation," Biomacromolecules, vol. 2, No. 3, 2001 (pp. 658-663).

(Continued)

Primary Examiner—William Neuder
Assistant Examiner—Nicole A Coy
(74) Attorney, Agent, or Firm—Craig W. Roddy; Baker Botts, L.L.P.

(57) ABSTRACT

The present invention relates to the delivery of a plurality of chemical components in well bore applications. More particularly, this invention relates to delivery capsules and methods of using such delivery capsules for facilitating the delivery of at least a plurality of chemical components to subterranean well bores. In one embodiment, a method of supplying chemical components to a subterranean formation comprises placing a delivery capsule having at least a first chamber comprising a first chemical component and at least a second chamber comprising a second chemical component into the subterranean formation, and allowing the first and second components to be released from the delivery capsule. In other embodiments, the present invention provides a delivery capsule for facilitating the delivery of a plurality of chemical components to a well bore penetrating a subterranean formation comprising a first chamber containing a first chemical component and at least a second chamber containing a second chemical component.

48 Claims, No Drawings

U.S. PATENT DOCUMENTS

| | | | |
|---|---|---|---|
| 5,437,331 A | 8/1995 | Gupta et al. | 166/300 |
| 5,439,055 A | 8/1995 | Card et al. | 166/280 |
| 5,460,226 A | 10/1995 | Lawson et al. | 166/300 |
| 5,475,080 A | 12/1995 | Gruber et al. | 528/354 |
| 5,484,881 A | 1/1996 | Gruber et al. | 528/354 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,718,292 A | 2/1998 | Heathman et al. | 166/387 |
| 5,728,209 A | 3/1998 | Bury et al. | 106/819 |
| 5,849,401 A | 12/1998 | El-Afandi et al. | 428/215 |
| 5,911,923 A | 6/1999 | Work et al. | 264/4.7 |
| 5,922,652 A | 7/1999 | Kowalski et al. | 507/129 |
| 5,996,693 A | 12/1999 | Heathman | 166/291 |
| 6,131,661 A | 10/2000 | Conner et al. | |
| 6,143,698 A | 11/2000 | Murphey et al. | |
| 6,162,766 A | 12/2000 | Muir et al. | 507/267 |
| 6,189,615 B1 | 2/2001 | Sydansk | 166/270 |
| 6,207,620 B1 | 3/2001 | Gonzalez et al. | 507/277 |
| 6,209,646 B1 | 4/2001 | Reddy et al. | 166/300 |
| 6,225,262 B1 | 5/2001 | Irwin et al. | 507/203 |
| 6,242,390 B1 | 6/2001 | Mitchell et al. | 507/211 |
| 6,270,565 B1 | 8/2001 | Heathman | 106/696 |
| 6,279,656 B1 | 8/2001 | Sinclair et al. | 166/310 |
| 6,323,307 B1 | 11/2001 | Bigg et al. | 528/354 |
| 6,326,458 B1 | 12/2001 | Gruber et al. | 528/354 |
| 6,357,527 B1 | 3/2002 | Norman et al. | 166/300 |
| 6,380,138 B1 | 4/2002 | Ischy et al. | |
| 6,387,986 B1 | 5/2002 | Moradi-Araghi et al. | 523/211 |
| 6,394,185 B1 | 5/2002 | Constien | 166/296 |
| 6,444,316 B1 | 9/2002 | Reddy et al. | 427/407 |
| 6,485,947 B1 | 11/2002 | Rajgarhia et al. | 435/139 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,599,863 B1 | 7/2003 | Palmer et al. | 507/219 |
| 6,645,288 B1 | 11/2003 | Dargaud et al. | 106/696 |
| 6,648,962 B2 | 11/2003 | Berke et al. | 106/696 |
| 6,655,475 B1 | 12/2003 | Wald | 175/64 |
| 6,669,771 B2 | 12/2003 | Tokiwa et al. | 106/162 |
| 6,689,208 B1 | 2/2004 | Brothers | 106/794 |
| 6,702,022 B2 | 3/2004 | Kattsyn et al. | 166/304 |
| 6,702,023 B1 | 3/2004 | Harris et al. | |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | |
| 6,896,058 B2 | 5/2005 | Munoz, Jr. et al. | |
| 6,949,491 B2 | 9/2005 | Cooke, Jr. | |
| 2001/0016562 A1 | 8/2001 | Muir et al. | 507/201 |
| 2002/0004464 A1 | 1/2002 | Nelson et al. | 507/200 |
| 2002/0036088 A1 | 3/2002 | Todd | |
| 2002/0125012 A1 | 9/2002 | Dawson et al. | 166/300 |
| 2002/0147113 A1 | 10/2002 | Green | 507/104 |
| 2002/0193257 A1 | 12/2002 | Lee et al. | 507/200 |
| 2003/0060374 A1* | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0134751 A1 | 7/2003 | Lee et al. | 507/200 |
| 2003/0185881 A1 | 10/2003 | Nowak | 424/463 |
| 2003/0234103 A1 | 12/2003 | Lee et al. | 166/293 |
| 2003/0236171 A1 | 12/2003 | Nguyen et al. | 507/100 |
| 2004/0014607 A1 | 1/2004 | Sinclair et al. | 507/200 |
| 2004/0040706 A1 | 3/2004 | Hossaini et al. | 166/278 |
| 2004/0043906 A1 | 3/2004 | Heath et al. | 507/200 |
| 2004/0063588 A1 | 4/2004 | Rose et al. | 507/113 |
| 2004/0094300 A1 | 5/2004 | Sullivan et al. | |
| 2004/0110645 A1 | 6/2004 | Campbell | 507/200 |
| 2004/0138068 A1* | 7/2004 | Rimmer et al. | 507/100 |
| 2004/0152601 A1 | 8/2004 | Still et al. | 507/100 |
| 2004/0214724 A1 | 10/2004 | Todd et al. | |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0051330 A1 | 3/2005 | Nguyen | |
| 2005/0056423 A1 | 3/2005 | Todd et al. | |
| 2005/0059557 A1 | 3/2005 | Todd et al. | |
| 2005/0103496 A1 | 5/2005 | Todd et al. | |
| 2005/0126785 A1 | 6/2005 | Todd et al. | |
| 2005/0161220 A1 | 7/2005 | Todd et al. | |
| 2005/0167105 A1 | 8/2005 | Roddy et al. | |
| 2005/0167107 A1 | 8/2005 | Roddy et al. | |
| 2005/0191346 A1* | 9/2005 | Nowak et al. | 424/451 |
| 2005/0252659 A1 | 11/2005 | Sullivan et al. | |
| 2005/0272613 A1 | 12/2005 | Cooke, Jr. | |

FOREIGN PATENT DOCUMENTS

| | | |
|---|---|---|
| EP | 0 879 935 A3 | 10/1999 |
| EP | 1 413 710 A1 | 4/2004 |
| RU | 2 196 221 C2 | 1/2003 |
| RU | 2 199 226 C2 | 1/2003 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 97/35537 | 10/1997 |
| WO | WO 00/27367 | 5/2000 |
| WO | WO 00/49272 | 8/2000 |
| WO | WO 01/03676 A1 | 1/2001 |
| WO | WO 02/12674 A1 | 2/2002 |
| WO | WO 03/027431 A2 | 4/2003 |
| WO | WO 03/027431 A3 | 4/2003 |
| WO | WO 2004/001188 A1 | 12/2003 |
| WO | WO 2004/037946 A1 | 5/2004 |
| WO | WO 2004/038176 A1 | 5/2004 |
| WO | WO 2004/037946 A1 | 5/2006 |

OTHER PUBLICATIONS

Yin, et al., "Preparation and Characterization of Substituted Polylactides," Am. Chem. Soc., vol. 32, No. 23, 1999 (7711-7718).

Yin, et al., "Synthesis and Properties of Polymers Derived form Substituted Lactic Acids," Am. Chem. Soc., Ch. 12, 2001 (pp. 147-159).

Paper entitled "Controlled Ring-Opening Polymerization of Lactide and Glycolide" by Odile Dechy-Cabaret et al., dated 2004.

Paper entitled "A New Assay for the Enzymatic Degradation of Polylactic Acid" by Virun Vichaibun et al., dated 2003.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Protiens*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Foreign communication from a related counterpart application dated Feb. 2, 2006.

Todd, Brad et al., "A Chemical 'Trigger' Useful for Oilfield Applications" dated 2005, SPE 92709.

Cordes, E.H. et al., "Mechanism and Catalysis for Hydrolysis of Acetals, Ketals and Ortho Esters" dated 1973.

\* cited by examiner

COMPOSITIONS AND METHODS FOR THE DELIVERY OF CHEMICAL COMPONENTS IN SUBTERRANEAN WELL BORES

BACKGROUND OF THE INVENTION

The present invention relates to the delivery of a plurality of chemical components in well bore applications. More particularly, this invention relates to delivery capsules and methods of using such delivery capsules for facilitating the delivery of at least a plurality of chemical components to subterranean well bores.

Using delivery capsules is a well-known method of providing or facilitating the delivery of chemicals to perform a desired function. For instance, the use of ingestible gelatin capsules is a commonly used technique for the effective and safe delivery of pharmaceuticals and dietary supplements. In such applications, liquid preparations are typically encapsulated in gelatin capsules, while particulate or powdered preparations are typically encapsulated in two-part hard gelatin capsules. The capsules are designed to release their contents after ingestion, typically by a sort of degradation or dissolution of the capsule wall. Other common uses of delivery capsules include the delivery of cosmetic or paint ingredients.

Similar capsules, however, heretofore have not been available for use in subterranean well bore applications as a means to deliver or facilitate the delivery of chemical components to a well bore or the surrounding subterranean formation to perform a desired function, e.g., acidizing, foaming, or the like. Such capsules are beneficial in that they, inter alia, may aid in the handling of potentially hazardous chemical components. For instance, when a well bore is acidized, acid is generally pumped into the well from a tank and into the portion of the formation to be treated. The acid, while in transit before, during, and after the acidizing treatment, presents a potential hazard to the equipment and personnel exposed to the acid. Moreover, such acids can have the tendency to attack the pumps, the metal tubing leading to and within the casing as well as all necessary oil well tools and connecting lines. The expense of repairing or replacing the corrosion-damaged parts may be very high and undesirable.

Such capsules are also beneficial in that they may, inter alia, aid in the delivery of chemical components where it is desired that they combine and react downhole. For instance, when a well bore fluid such as a drilling fluid, spacer, or cement is pumped into the well and then foamed in situ. The capsulated components used to produce the foamed fluid are placed in the fluid that is pumped downhole and then released, whereby they react and foam the fluid located in the well. The reduced expense of conventional foaming equipment needed at the surface can be desirable.

SUMMARY OF THE INVENTION

The present invention relates to the delivery of a plurality of chemical components in well bore applications. More particularly, this invention relates to delivery capsules and methods of using such delivery capsules for facilitating the delivery of at least a plurality of chemical components to subterranean well bores.

An exemplary embodiment of a method of the present invention is a method of supplying chemical components to a subterranean formation comprising the steps of: placing a delivery capsule having at least a first chamber comprising a first chemical component and at least a second chamber comprising a second chemical component into the subterranean formation, and allowing the first and second components to be released from the delivery capsule.

Another exemplary embodiment of a method of the present invention is a method of providing an acid in a subterranean formation comprising the steps of: providing a delivery capsule that comprises at least a first chamber comprising a first chemical component and at least a second chamber comprising a second chemical component, wherein the first chemical component and the second chemical component can react to form an acid when mixed; introducing the delivery capsule into the well bore penetrating the subterranean formation; and allowing the first and second components to form an acid.

Another exemplary embodiment of a method of the present invention is a method of acidizing a subterranean formation penetrated by a well bore comprising the steps of: providing a delivery capsule that comprises at least a first chamber comprising a first chemical component and at least a second chamber comprising a second chemical component, wherein the first chemical component and the second chemical component can react to form an acid when mixed; introducing the delivery capsule into the well bore penetrating the subterranean formation; allowing the first and second components to form an acid; and allowing the acid to acidize the subterranean formation.

Another exemplary embodiment of a method of the present invention is a method of foaming a cement composition comprising the steps of: providing a delivery capsule that comprises at least a first chamber comprising a first chemical component and at least a second chamber comprising a second chemical component, wherein the first chemical component and the second chemical component can react to form a gas when mixed; introducing the delivery capsule to the cement composition; allowing the first and second components to form a gas; and allowing the gas to foam the cement composition.

In another exemplary embodiment, the present invention provides a delivery capsule for facilitating the delivery of a plurality of chemical components to a well bore penetrating a subterranean formation comprising a first chamber containing a first chemical component and at least a second chamber containing a second chemical component.

In another exemplary embodiment, the present invention provides an acid delivery means comprising a first chamber containing a first chemical component and at least a second chamber containing a second chemical component, wherein the first chemical component and the second chemical component can react to form an acid when mixed.

In another exemplary embodiment, the present invention provides a gas delivery means comprising a first chamber containing a first chemical component and at least a second chamber containing a second chemical component, wherein the first chemical component and the second chemical component can react to form a gas when mixed.

The features and advantages of the present invention will be readily apparent to those skilled in the art upon a reading of the description of the preferred embodiments, which follows.

DESCRIPTION OF PREFERRED EMBODIMENTS

The present invention relates to the delivery of a plurality of chemical components in well bore applications. More particularly, this invention relates to delivery capsules and methods of using such delivery capsules for facilitating the delivery of at least a plurality of chemical components to subterranean well bores.

The delivery capsules of the present invention are designed, inter alia, to enclose and/or protect their contents until an intended site of delivery or conditions of delivery are encountered. An example of a suitable delivery capsule is described in PCT Publication No. WO 01/03676 A1, the relevant disclosure of which is incorporated herein by reference. In this way, in certain embodiments, the delivery capsules can be used as a means to contain potentially hazardous or difficult-to-handle components and to deliver such components to a well bore or a surrounding subterranean formation to perform a desired function. The delivery capsules of the present invention also may be used with any downhole fluids where it is desirable to have components separated until they are released so that they may react with each other and/or the formation. Examples of such downhole fluids include, inter alia, drilling, completion and workover fluids.

In most embodiments, the delivery capsules of the present invention may be spherical, ovoid, or cylindrical in shape, and may comprise at least two chambers. In certain embodiments, the two chambers within the delivery capsule preferably are separated by an impermeable dividing wall, which, among other things, prevents mixing of the chemical components contained in each chamber. In preferred embodiments, the dividing wall should not allow one chemical component in one chamber to mix with a second chemical component in the second chamber. If desired, these two chambers may be divided into subchambers, e.g., each chamber may be divided into at least one other subchamber. Such embodiments may be useful wherein it is desirable to provide or facilitate the delivery of more than two chemical components to the well bore or the subterranean formation surrounding the well bore.

To achieve certain beneficial effects of the present invention, the first chemical component and the second chemical component may be completely separated by the dividing wall until delivery or release of the chemicals into the subterranean formation. The first chamber and the second chamber may be of similar size and shape or of different size and shape, e.g., when different proportions of the first chemical component and the second chemical component are needed for the desired application. Typically, the delivery capsules of the present invention range from about 3 mm to about 20 mm in size, but other sizes may also be suitable, depending on the chemical components to be supplied and the purpose of using the delivery capsules. One of ordinary skill in the art, with the benefit of this disclosure, will recognize the appropriate embodiment(s) of the capsules of the present invention that are suitable for a chosen application.

Each chamber in a delivery capsule may contain a chemical component to be carried downhole for a chosen application. In certain embodiments, the chambers may contain different chemical components that may perform different functions once released. For instance, the capsule could contain both a cement-expanding agent and a cement accelerator for release in a well bore cement composition. In other embodiments, each chamber may contain a different chemical that, when released, combines to perform a desired function downhole. For example, in one embodiment, the first chemical component in the first chamber of a delivery capsule of the present invention and the second chemical component in the second chamber of the same delivery capsule, when released, react to form an acid downhole that can be used, for example, to acidize a chosen portion of the subterranean formation. For instance, in an example of this embodiment, the first chemical component comprises a formaldehyde solution and the second chemical component comprises an ammonium salt, as taught in U.S. Pat. No. 3,157,232, the relevant disclosure of which is incorporated herein by reference. When the formaldehyde solution and the ammonium salt are released upon the degradation of the capsule, they react with one another to form an acid. The resultant acid may be used, inter alia, to acidize a portion of the subterranean formation surrounding the well bore. In another embodiment, a first chemical component contained in a first chamber of a delivery capsule of the present invention and a second chemical component in a second chamber of the same delivery capsule, when released, react to form a gas. For instance, the first chemical component may comprise aluminum powder and the second chemical component may comprise a liquid caustic such as sodium hydroxide. This embodiment may be useful in applications wherein it is desirable to impart a gas to a fluid or composition. One example is the foaming of a cement composition to reduce its density.

The chemical components contained within the chambers of the delivery capsules of the present invention may be liquids, solids (e.g., powders), and/or gases, as is necessary for a chosen application. In most embodiments, the different chambers of the delivery capsules will contain different materials, possibly in different forms, e.g., liquid, solid, slurry, etc.

The delivery capsules of the present invention are preferably made from a degradable material that degrades when subjected to downhole conditions so as to release the chemical components that are contained in the chambers of the delivery capsules into the well bore. Such degradable materials may include degradable polymers. Such degradable materials may be capable of undergoing an irreversible degradation downhole. The term "irreversible" as used herein means that the degradable material, once degraded downhole, should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result, inter alia, of a chemical or thermal reaction or a reaction induced by radiation. One should be mindful that the degradability of a polymer depends at least in part on its backbone structure. For instance, the presence of hydrolyzable and/or oxidizable linkages in the backbone often yields a material that will degrade as described herein. The physical properties of degradable polymers depend on several factors such as the composition of the repeat units, flexibility of the chain, presence of polar groups, molecular mass, degree of branching, crystallinity, orientation, etc. For example, short-chain branches reduce the degree of crystallinity of polymers while long-chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains.

For example, poly(phenyllactide) will degrade at about ⅕th of the rate of racemic poly(lactide) at a pH of 7.4 at 55° C. One of ordinary skill in the art with the benefit of this disclosure will be able to determine the appropriate degradable polymer to achieve the desired physical properties of the degradable polymeric material.

Suitable examples of degradable materials that may be used in accordance with the present invention include, but are not limited to, those described in the publication of *Advances in Polymer Science*, Vol. 157, entitled "Degradable Aliphatic Polyesters" and edited by A. C. Albertsson, pages 1–138. Examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable degradable materials include polysaccharides such as dextrans or celluloses; chitins; chitosans; liquid esters (e.g., triethyl citrate); proteins (e.g., gelatin); aliphatic polyesters; poly(lactides); poly(glycolides); poly($\epsilon$-caprolactones); poly(hydroxybutyrates); poly(anhydrides); aliphatic poly(carbonates); ortho esters, poly(orthoesters); poly(amino acids); poly(ethylene oxides); and poly(phosphazenes). Other suitable materials include heat-sealable materials, other thermoplastic materials, or those that may be dissolved with an appropriate solvent. Examples include hydroxy propyl methylcellulose, pectin, polyethylene oxide, polyvinyl alcohol, alginate, polycaprolactone, gelatinised starch-based materials, and the like. In one embodiment, hydroxy propyl methylcellulose (HPMC) is used.

In alternative embodiments, the delivery capsules may be coated with coatings that, inter alia, may facilitate the dispersion of the delivery capsules in a fluid or composition or, in some way, alter the solubility of the delivery capsules in the subterranean environment. Suitable coatings, include, but are not limited to, gum arabics, pectins, and alginates. Such coatings may be used to impart a degree of resistance, if desired, to the delivery capsule's solubility. For instance, gum arabic, pectin, and alginate all have a slight retarding effect on HPMC solubility; the extent of the effect may vary, depending on the thickness of the coating. This may be desirable when a delay period is beneficial before the chemical components contained within the delivery capsules are released. Also, both pectin and alginate may be cross-linked to provide a degree of pH resistance to the delivery capsules so that they will not degrade so as to release their contained chemical components until a desired pH is encountered.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications Also, in some embodiments, it is desirable for the degradable material to degrade slowly over time as opposed to instantaneously.

In alternative embodiments, different degradable materials (in terms of thickness and/or composition and/or coatings) may be used to define the different chambers in a capsule of different capsules within a composition. For instance, using a thicker material to define one chamber in a capsule may result in a slightly delayed release of the chemical component within that chamber. In this way, it is possible to provide for the release of different chemical components in the chambers under different conditions, for instance, different temperatures or at different pHs. In one embodiment, such different degradable materials in a capsule may be used to facilitate the delivery of a first chemical component to one portion of the well bore and the delivery of a second chemical component to a second portion of the well bore.

If the application in which the degradable delivery capsule will be used does not contain a component that will enable the degradable material to degrade, e.g., in a dry gas hole, then in alternative embodiments of the present invention, the degradable material can be mixed with inorganic or organic compound. In preferred alternative embodiments, the inorganic or organic compound is hydrated. Examples of the hydrated organic or inorganic solid compounds that can be utilized, include, but are not limited to, hydrates of organic acids or their salts such as sodium acetate trihydrate, L-tartaric acid disodium salt dihydrate, sodium citrate dihydrate, hydrates of inorganic acids, or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The degradable material is then in a sense self-degradable, in that the degradable should at least partially degrade in the releasable water provided by the hydrated organic or inorganic compound, which dehydrates over time when heated in the subterranean zone.

In one embodiment, a method of acidizing a subterranean formation penetrated by a well bore comprises the steps of providing a delivery capsule of the present invention that has separate chambers which contain components that, when released, form an acid downhole. The acid may be used, inter alia, to degrade the filter cake, break a viscosified treatment fluid (e.g., a fracturing fluid or a gravel pack fluid), or perform an acidization of a chosen region of the subterranean formation. For instance, the delivery capsule may contain a formaldehyde solution in one chamber and an ammonium salt. When the capsule degrades and the formaldehyde solution and the ammonium salt are released, they will form an acid. The resultant acid may be used, for example, to degrade the filter cake, break a viscosified treatment fluid, or acidize the formation.

In an alternative embodiment, a delivery capsule of the present invention whose chambers contain components that, when released, form a gas when downhole. For instance, a delivery capsule separately containing aluminum powder and a liquid caustic such as sodium hydroxide could be used in this embodiment. These components, when combined downhole, react to form a gas, which may be useful, for example, to foam a cement slurry to create a foamed cement or a lower density cement.

Thus, the present invention is well-adapted to carry out the objects and attain the ends and advantages mentioned, as well as those that are inherent therein. While numerous changes may be made by those skilled in the art, such changes are encompassed within the spirit and scope of this invention as defined by the appended claims.

What is claimed is:

1. A method of supplying chemical components to a subterranean formation comprising the steps of:
   placing a delivery capsule having at least a first chamber comprising a first chemical component and at least a second chamber comprising a second chemical component into the subterranean formation, the delivery capsule being capable of a hydrolytic degradation; and
   allowing the delivery capsule to hydrolytically degrade so as to allow release of the first and second chemical components from the delivery capsule.

2. The method of claim 1 wherein the first chemical component is a liquid, a powder, or a mixture thereof.

3. The method of claim 1 wherein the second chemical component is a liquid, a powder, or a mixture thereof.

4. The method of claim 1 wherein the first chemical component and the second chemical component react to form an acid when mixed.

5. The method of claim 4 wherein the first chemical component comprises a formaldehyde solution and the second chemical component comprises an ammonium salt.

6. The method of claim 1 wherein the first chemical component and the second chemical component react to form a gas when mixed.

7. The method of claim 6 wherein the first chemical component comprises an aluminum powder and the second chemical component comprises sodium hydroxide.

8. The method of claim 1 wherein the delivery capsule is spherical, ovoid, or cylindrical in shape.

9. The method of claim 1 wherein at least one of the first chamber and the second chamber comprises a subchamber that contains a chemical component.

10. The method of claim 1 wherein the first chamber and the second chamber are separated by an impermeable dividing wall.

11. The method of claim 1 wherein the first chamber and the second chamber are not the same size or shape.

12. The method of claim 1 wherein the delivery capsule is about 3 mm to about 20 mm in size.

13. The method of claim 1 wherein the first chemical component and the second chemical component are different.

14. The method of claim 1 wherein the delivery capsule comprises a degradable material.

15. The method of claim 14 wherein the degradable material is dextran, cellulose, a chitin, a chitosan, a liquid ester, a protein, an aliphatic polyester, a poly(lactide), a poly(glycolide), a poly(s-caprolactone), a poly(hydroxybutyrate), a poly(anhydride), an aliphatic poly(carbonate), an ortho ester, a poly(orthoester), a poly(amino acid), a poly(ethylene oxide), or a poly(phosphazene).

16. The method of claim 1 wherein the delivery capsule comprises a coating.

17. The method of claim 1 wherein the first chamber is defined by a first degradable polymeric material and the second chamber is defined by a second degradable polymeric material.

18. The method of claim 1 wherein the delivery capsule is an inorganic or organic compound.

19. A method of foaming a cement composition comprising the steps of:
   providing a delivery capsule that is capable of a hydrolytic degradation and that comprises at least a first chamber comprising a first chemical component and at least a second chamber comprising a second chemical component, wherein the first chemical component and the second chemical component can react to form a gas when mixed;
   introducing the delivery capsule to the cement composition;
   allowing the delivery capsule to hydrolytically degrade so as to release the first and second components so as to form a gas; and
   allowing the gas to foam the cement composition.

20. The method of claim 19 wherein the first chemical component comprises aluminum powder and the second chemical component comprises a liquid caustic.

21. The method of claim 19 wherein the foaming of the cement composition takes place within a subterranean formation.

22. The method of claim 19 wherein the delivery capsule is spherical, ovoid, or cylindrical in shape.

23. The method of claim 19 wherein at least one of the first chamber and the second chamber comprises a subchamber that contains a chemical component.

24. The method of claim 19 wherein the first chamber and the second chamber are not the same size or shape.

25. The method of claim 19 wherein the delivery capsule is about 3 mm to about 20 mm in size.

26. The method of claim 19 wherein the delivery capsule comprises a degradable material.

27. The method of claim 26 wherein the degradable material is dextran, cellulose, a chitin, a chitosan, a liquid ester, a protein, an aliphatic polyester, a poly(lactide), a poly(glycolide), a poly(c-caprolactone), a poly(hydroxybutyrate), a poly(anhydride), an aliphatic poly(carbonate), an ortho ester, a poly(orthoester), a poly(amino acid), a poly(ethylene oxide), or a poly(phosphazene).

28. A method of providing separated components in a downhole fluid comprising the steps of:
   placing a delivery capsule having at least a first chamber comprising a first component and at least a second chamber comprising a second component in the downhole fluid; and
   allowing the delivery capsule to hydrolytically degrade so as to release the first and second components from the delivery capsule.

29. The method of claim 28 wherein the first chemical component is a liquid, a powder, or a mixture thereof.

30. The method of claim 28 wherein the second chemical component is a liquid, a powder, or a mixture thereof.

31. The method of claim 28 wherein the first chemical component and the second chemical component react to form an acid when mixed.

32. The method of claim 31 wherein the first chemical component comprises a formaldehyde solution and the second chemical component comprises an ammonium salt.

33. The method of claim 28 wherein the first chemical component and the second chemical component react to form a gas when mixed.

34. The method of claim 33 wherein the first chemical component comprises an aluminum powder and the second chemical component comprises sodium hydroxide.

35. The method of claim 28 wherein the delivery capsule is spherical, ovoid, or cylindrical in shape.

36. The method of claim 28 wherein the first chamber or the second chamber comprises a subchamber that contains a chemical component.

37. The method of claim 28 wherein the first chamber and the second chamber are separated by an impermeable dividing wall.

38. The method of claim 28 wherein the first chamber and the second chamber are not the same size or shape.

39. The method of claim 28 wherein the delivery capsule is about 3 mm to about 20 mm in size.

40. The method of claim 28 wherein the first chemical component and the second chemical component are different.

41. The method of claim 28 wherein the delivery capsule comprises a degradable material.

42. The method of claim 41 wherein the degradable material is dextran, cellulose, a chitin, a chitosan, a liquid ester, a protein, an aliphatic polyester, a poly(lactide), a poly(glycolide), a poly(E-caprolactone), a poly(hydroxybutyrate), a poly(anhydride), an aliphatic poly(carbonate), an ortho ester, a poly(orthoester), a poly(amino acid), a poly (ethylene oxide), or a poly(phosphazene).

43. The method of claim 28 wherein the delivery capsule comprises a coating.

44. The method of claim 28 wherein the first chamber is defined by a first degradable polymeric material and the second chamber is defined by a second degradable polymeric material.

45. The method of claim 28 wherein the delivery capsule is an inorganic or organic compound.

46. The method of claim 28 wherein the downhole fluid is selected from the group consisting of drilling, completion and workover fluids.

47. A method of supplying chemical components to a subterranean formation comprising the steps of:
   placing a delivery capsule having at least a first chamber comprising a first chemical component and at least a second chamber comprising a second chemical component into the subterranean formation, wherein the delivery capsule comprises a polyester; and
   allowing the first and second components to be released from the delivery capsule by way of a chemical degradation of the delivery capsule.

48. A method of supplying chemical components to a subterranean formation comprising the steps of:
   placing a delivery capsule having at least a first chamber comprising a first chemical component and at least a second chamber comprising a second chemical component into the subterranean formation; and
   allowing the first and second components to be released from the delivery capsule by way of a chemical degradation of the delivery capsule.

* * * * *